US 9,740,863 B2

(12) United States Patent
Sherman (10) Patent No.: US 9,740,863 B2
(45) Date of Patent: Aug. 22, 2017

(54) PROTECTING A SECURE BOOT PROCESS AGAINST SIDE CHANNEL ATTACKS

(71) Applicant: Intel Corporation, Santa Clara, CA (US)

(72) Inventor: Brent M. Sherman, Portland, OR (US)

(73) Assignee: Intel Corporation, Santa Clara, CA (US)

(*) Notice: Subject to any disclaimer, the term of this patent is extended or adjusted under 35 U.S.C. 154(b) by 241 days.

(21) Appl. No.: 14/552,667

(22) Filed: Nov. 25, 2014

(65) Prior Publication Data

US 2016/0357963 A1 Dec. 8, 2016

(51) Int. Cl.
*G06F 9/00* (2006.01)
*G06F 9/24* (2006.01)
*H04L 9/32* (2006.01)
*G06F 21/56* (2013.01)
*G06F 21/57* (2013.01)

(52) U.S. Cl.
CPC .......... *G06F 21/566* (2013.01); *G06F 21/575* (2013.01)

(58) Field of Classification Search
CPC .................................................... G06F 9/4401
USPC ........................................................... 713/2
See application file for complete search history.

(56) References Cited

U.S. PATENT DOCUMENTS

| | | | | |
|---|---|---|---|---|
| 6,393,585 B1* | 5/2002 | Houha | .............. | G06F 9/4418 713/100 |
| 6,782,477 B2* | 8/2004 | McCarroll | .............. | G06F 21/51 713/176 |
| 6,892,305 B1* | 5/2005 | Dayan | .............. | G06F 21/575 713/1 |
| 7,596,531 B2* | 9/2009 | de Jong | .............. | G06F 21/31 705/317 |
| 8,638,927 B2* | 1/2014 | Takenaka | .............. | G06F 7/723 380/28 |
| 9,230,112 B1* | 1/2016 | Peterson | .............. | G06F 21/575 |
| 2014/0059688 A1* | 2/2014 | Margalit | .............. | G06F 21/561 726/24 |

* cited by examiner

*Primary Examiner* — Suresh Suryawanshi
(74) *Attorney, Agent, or Firm* — Nicholson De Vos Webster & Elliott LLP (57) ABSTRACT

Embodiments of an invention for protecting a secure boot process against side channel attacks are disclosed. In one embodiment, an apparatus includes cryptography hardware, a non-volatile memory, a comparator, and control logic. The cryptography hardware is to operate during a first boot process. The non-volatile memory includes a storage location in which to store a count of tampered boots. The comparator is to perform a comparison of the count of tampered boots to a limit. The control logic is to, based on the first comparison, transfer control of the apparatus from the first boot process to a second boot process.

18 Claims, 5 Drawing Sheets

FIGURE 4
METHOD 400

FIGURE 5
METHOD 500

PROTECTING A SECURE BOOT PROCESS AGAINST SIDE CHANNEL ATTACKS

BACKGROUND

1. Field

The present disclosure pertains to the field of information processing, and more particularly, to the field of security in information processing systems.

2. Description of Related Art

Malicious attacks are a serious threat to the security of information processing systems and devices. Side channel attacks use analyses of power consumption, electromagnetic radiation, acoustic measurements, timing, or other characteristics of a data processing system or device to infer information about the system, the device, or the data being processed. As one example, side channel analysis during a secure boot process might be used by an attacker to help to detect the value of an encryption key involved in the process. Many techniques have been developed to defend against side channel attacks, but more are needed as information processing system development continues.

BRIEF DESCRIPTION OF THE FIGURES

The present invention is illustrated by way of example and not limitation in the accompanying figures.

DETAILED DESCRIPTION

Embodiments of an invention for protecting a secure boot process against side channel attacks are described. In this description, numerous specific details, such as component and system configurations, may be set forth in order to provide a more thorough understanding of the present invention. It will be appreciated, however, by one skilled in the art, that the invention may be practiced without such specific details. Additionally, some well-known structures, circuits, and other features have not been shown in detail, to avoid unnecessarily obscuring the present invention.

In the following description, references to "one embodiment," "an embodiment," "example embodiment," "various embodiments," etc., indicate that the embodiment(s) of the invention so described may include particular features, structures, or characteristics, but more than one embodiment may and not every embodiment necessarily does include the particular features, structures, or characteristics. Further, some embodiments may have some, all, or none of the features described for other embodiments.

As used in this description and the claims and unless otherwise specified, the use of the ordinal adjectives "first," "second," "third," etc. to describe an element merely indicate that a particular instance of an element or different instances of like elements are being referred to, and is not intended to imply that the elements so described must be in a particular sequence, either temporally, spatially, in ranking, or in any other manner.

Also, the terms "bit," "flag," "field," "entry," "indicator," etc., may be used to describe any type of storage location in a register, table, database, or other data structure, whether implemented in hardware or software, but are not meant to limit embodiments of the invention to any particular type of storage location or number of bits or other elements within any particular storage location. The term "clear" may be used to indicate storing or otherwise causing the logical value of zero to be stored in a storage location, and the term "set" may be used to indicate storing or otherwise causing the logical value of one, all ones, or some other specified value to be stored in a storage location; however, these terms are not meant to limit embodiments of the present invention to any particular logical convention, as any logical convention may be used within embodiments of the present invention.

Also, as used in descriptions of embodiments of the present invention, a "/" character between terms may mean that an embodiment may include or be implemented using, with, and/or according to the first term and/or the second term (and/or any other additional terms).

As described in the background section, information might be leaked from a system through a side channel. For example, a secure boot process, as further described below, might leak information regarding the value of an encryption key, and an attacker might be able to use side channel analysis to reduce the search space required to discover the value of the key through trial and error. A secure boot process might be vulnerable to attack because it involves a cryptographic operation having distinct characteristics and an attacker might cause it to be repeated many times. An attack on a secure boot process might be automated by using a field programmable gate array to cause a system or a device to repeat many (e.g., 100,000) power/reset cycles while an analyzer triggers on a side channel measurement during the cryptographic operation. The use of embodiments of the present invention may be desired to detect side channel attacks on a secure boot process in order to initiate a protective reaction.

Figure 1:
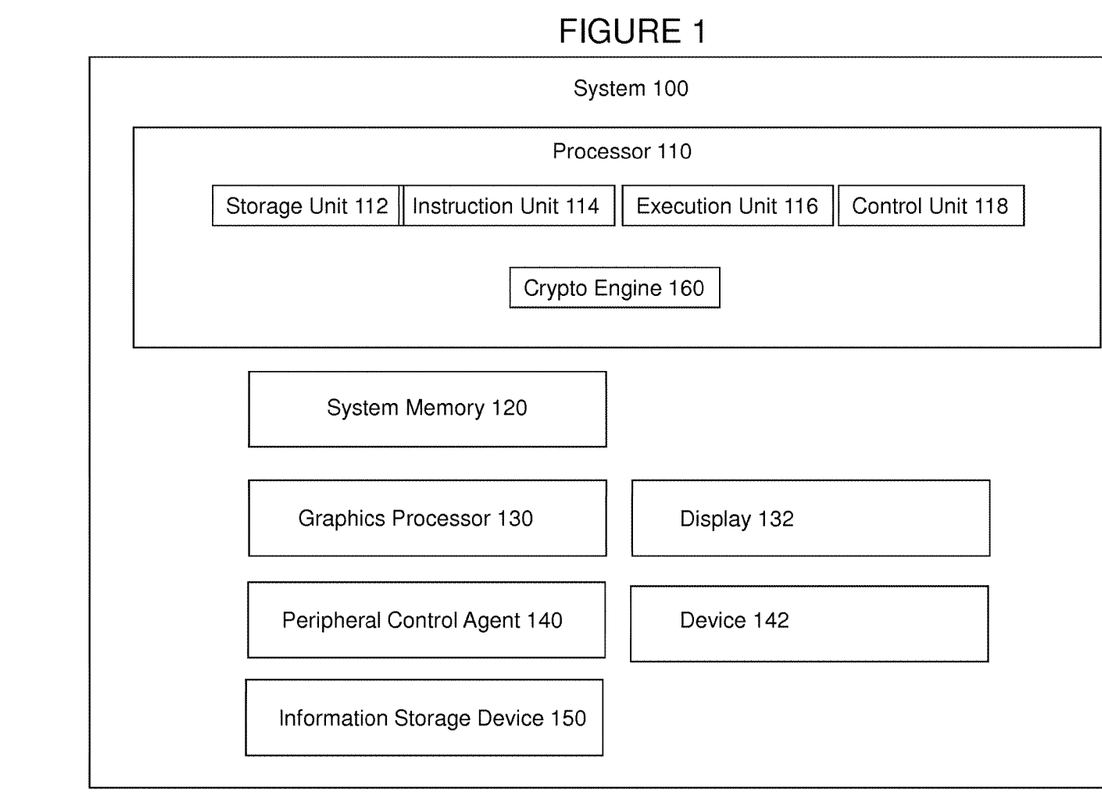
FIG. 1 illustrates a system including an embodiment of the present invention for protecting a secure boot process against side channels attacks.

FIG. 1 illustrates system 100, an information processing system including an embodiment of the present invention for protecting a secure boot process against side channel attacks. System 100 may represent any type of information processing system, such as a server, a desktop computer, a portable computer, a set-top box, a hand-held device such as a tablet or a smart phone, or an embedded control system. System 100 includes processor 110, system memory 120, graphics processor 130, peripheral control agent 140, and information storage device 150. Systems embodying the present invention may include any number of each of these components and any other components or other elements, such as peripherals and input/output devices. Any or all of the components or other elements in this or any system embodiment, may be connected, coupled, or otherwise in communication with each other through any number of buses, point-to-point, or other wired or wireless interfaces or connections, unless specified otherwise. Any components or other portions of system 100, whether shown in FIG. 1 or not shown in FIG. 1, may be integrated or otherwise included on or in a single chip (a system-on-a-chip or SOC), die, substrate, or package.

System memory 120 may be dynamic random access memory or any other type of medium readable by processor 110. Graphics processor 130 may include any processor or other component for processing graphics data for display 132. Peripheral control agent 140 may represent any component, such as a chipset component, including or through which peripheral, input/output (I/O), or other components or devices, such as device 142 (e.g., a touchscreen, keyboard, microphone, speaker, other audio device, camera, video or other media device, network adapter, motion or other sensor, receiver for global positioning or other information, etc.) and/or information storage device 150, may be connected or coupled to processor 110. Information storage device 150 may include any type of persistent or non-volatile memory or storage, such as a flash memory and/or a solid state, magnetic, or optical disk drive.

Processor 110 may represent one or more processors or processor cores integrated on a single substrate or packaged within a single package, each of which may include multiple threads and/or multiple execution cores, in any combination. Each processor represented as or in processor 110 may be any type of processor, including a general purpose microprocessor, such as a processor in the Intel® Core® Processor Family or other processor family from Intel® Corporation or another company, a special purpose processor or microcontroller, or any other device or component in an information processing system in which an embodiment of the present invention may be implemented.

Processor 110 may include storage unit 112, instruction unit 114, execution unit 116, control unit 118, and crypto engine 160, each as described below. Processor 110 may also include any other circuitry, structures, or logic not shown in FIG. 1. Furthermore, the functionality and or circuitry of each of the described and/or illustrated units of processor 110 may be combined and/or distributed in any manner.

Storage unit 112 may include any combination of any type of storage usable for any purpose within processor 110; for example, it may include any number of readable, writable, and/or read-writable registers, buffers, and/or caches, implemented using any memory or storage technology, in which to store capability information, configuration information, control information, status information, performance information, instructions, data, and any other information usable in the operation of processor 110, as well as circuitry usable to access such storage.

Instruction unit 114 may include any circuitry, logic, structures, and/or other hardware, such as an instruction decoder, to fetch, receive, decode, interpret, schedule, and/or handle instructions to be executed by processor 110. Any instruction format may be used within the scope of the present invention; for example, an instruction may include an opcode and one or more operands, where the opcode may be decoded into one or more micro-instructions or micro-operations for execution by execution unit 116. Operands or other parameters may be associated with an instruction implicitly, directly, indirectly, or according to any other approach.

Execution unit 116 may include any circuitry, logic, structures, and/or other hardware, such as arithmetic units, logic units, floating point units, shifters, etc., to process data and execute instructions, micro-instructions, and/or micro-operations. Execution unit 116 may represent any one or more physically or logically distinct execution units.

Control unit 118 may include any microcode, firmware, circuitry, logic, structures, and/or hardware to control the operation of the units and other elements of processor 110 and the transfer of data within, into, and out of processor 110.

Figure 2:
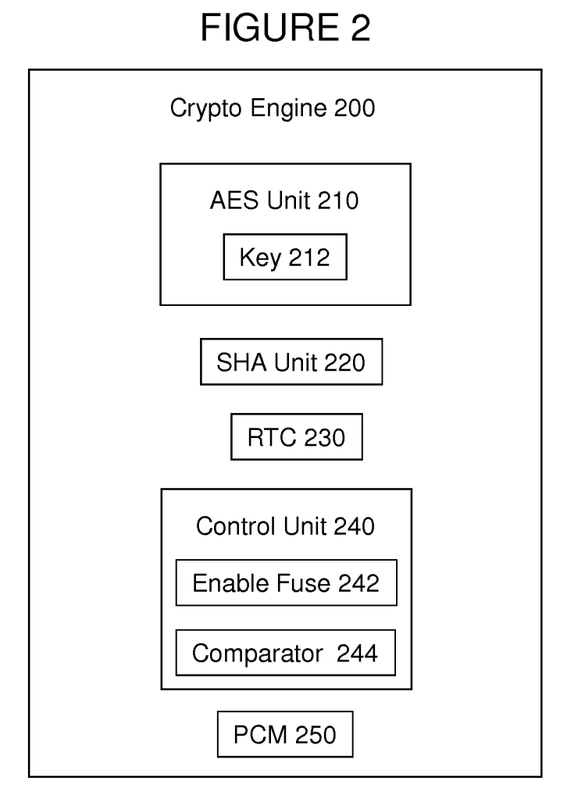
FIG. 2 illustrates a crypto engine according to an embodiment of the present invention for protecting a secure boot process against side channel attacks.

FIG. 2 illustrates crypto engine 200, which may serve as an embodiment of crypto engine 160 in FIG. 1. In FIG. 2, crypto engine 200 includes encryption unit 210, hash unit 220, clock 230, control unit 240, and non-volatile memory (NVM) 250.

Encryption unit 210 may represent any circuitry, logic, structures, and/or other hardware to execute any one or more encryption algorithms, such as an Advanced Encryption Standard (AES) algorithm, and the corresponding decryption algorithms. In performing encryption and/or decryption, encryption unit 210 may use secret key 212, which may represent any root key, key encryption key (KeK), processor or platform unique key, or other key, and may be embedded (e.g., with metal tie-ups or tie-downs) during fabrication, programmed into a fuse array, or otherwise included in processor 110. In an embodiment, secret key 212 (i.e., the memory or array in which it is stored) is inaccessible to software or firmware running on processor 110 or any other processor or other agent in system 100, in other words, secret key 212 is protected from being read by software or firmware. In an embodiment, secret key 212 may be hard-wired to encryption unit 210 such that only the hardware in encryption unit 210 has access to secret key 212.

Hash unit 220 may represent any circuitry, logic, structures, and/or other hardware to execute any one or more hashing algorithms, such as a Secure Hash Algorithm (SHA). Clock 230 may represent any circuitry, logic, structures, and/or other hardware to implement a clock, such as a Real Time Clock (RTC).

Control unit 240 may represent a read-only memory (ROM) and/or any other control store and associated circuitry, logic, structures, and/or other hardware to control and/or direct the operation of crypto engine 200. Control unit 240 may cause crypto engine 200 and/or processor 110 to perform or participate in the performance of method embodiments of the present invention, such as the method embodiments described below, for example, by causing crypto engine 200 to count and record the number of repetitions of a secure boot process, as further described below.

Control unit 240 may include or have access to an indicator 242 (a boot protection enable bit), which may be a fuse or other programmable storage element, to indicate whether a boot protection mechanism according to an embodiment of the present invention is enabled. Control unit 240 may also include or have access to comparator 244 to use to compare values for the purposes described below.

NVM 250 may include one or more read-writable registers or other storage locations, implemented using phase-change memory (PCM) or any other non-volatile memory or storage technology, in which to store information to be used to protect a secure boot process against side channel attacks according to an embodiment of the present invention.

Figure 3:
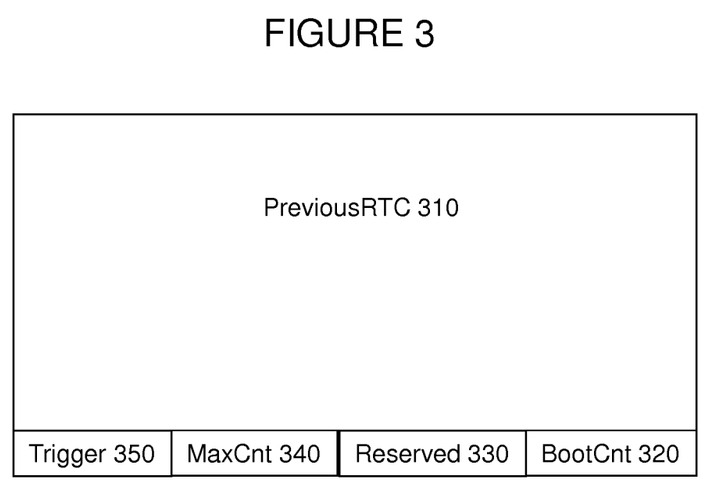
FIG. 3 illustrates an arrangement of storage locations in a non-volatile memory to store status information according to an embodiment of the present invention.

In an embodiment, NVM 250 may include storage for eight bytes, as shown in FIG. 3. Field 310 (PreviousRTC) may represent seven bytes of NVM storage to be used to store an RTC value. The eighth byte may be used to store status information between boot attempts, as set forth in Table 1 and further described below.

TABLE 1

| Bit Location(s) | Bit/Field Name | Description | Item Number in FIG. 3 |
|---|---|---|---|
| Bit[2:0] | BootCnt | Boot/Reset Counter | 320 |
| Bit[3] | Reserved | — | 330 |
| Bit[6:4] | MaxCnt | Maximum boot/reset count before setting the trigger bit. Valid values are 3, 4, 5, 6, and 7. | 340 |
| Bit[7] | Trigger | Status bit to signify that a side channel attack has been detected. | 350 |

In an embodiment, crypto engine 200 may represent a secure crypto engine that operates only in response to control signals from control unit 240, and the hardware (e.g., encryption unit 210, hash unit 220, clock 230, and/or the hardware of control unit 240) and/or storage locations (e.g., NVM 250) of crypto engine 200 may be used and/or accessed only by hardware and/or firmware within crypto engine 200, such that the hardware and/or storage locations in crypto engine are protected from use or access by firmware outside of crypto engine 200, software, and/or a user of processor 110 or system 100.

Figure 4:
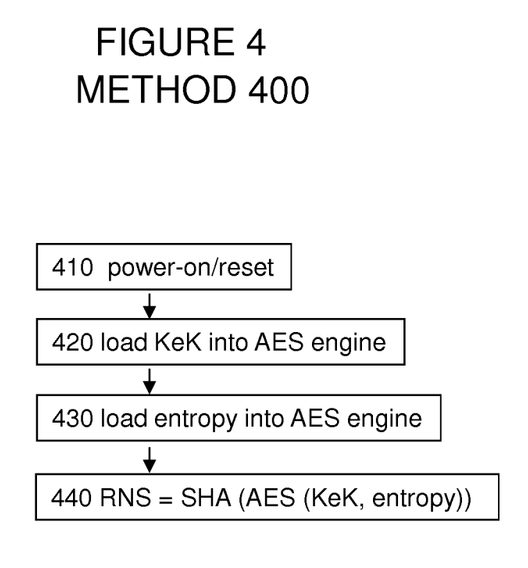
FIG. 4 illustrates for a secure boot process that may be protected against side channel attacks according to an embodiment of the present invention.
Figure 5:
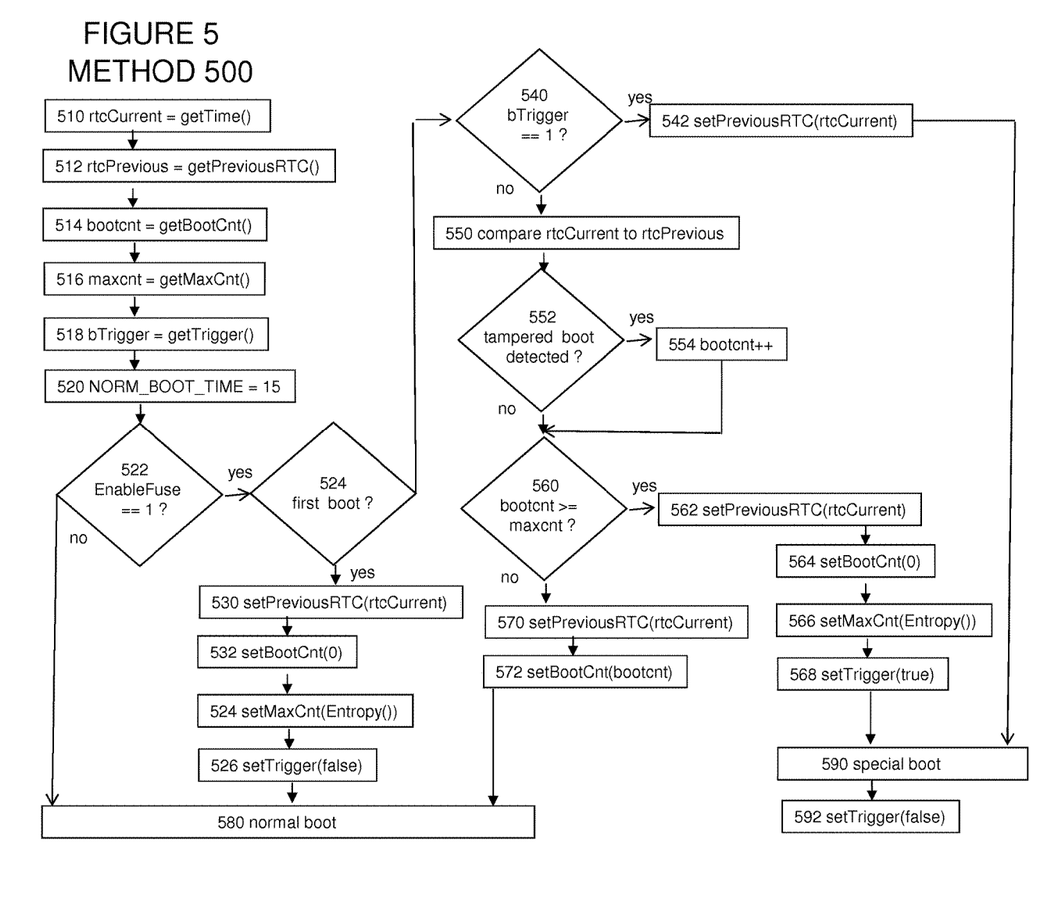
FIG. 5 illustrates a method for protecting a secure boot process against side channel attacks according to an embodiment of the present invention.

FIG. 4 illustrates method 400 for a secure boot process that may be protected against side channel attacks according to an embodiment of the present invention, and FIG. 5 illustrates method 500 for protecting a secure boot process against side channel attacks according to an embodiment of the present invention. Although method embodiments of the invention are not limited in this respect, reference may be made to elements of FIGS. 1, 2, and 3 to help describe the method embodiments of FIGS. 4 and 5. Various portions of methods 400 and 500 may be performed by hardware, firmware, software, and/or a user of a system or device.

In box 410 of method 400, power is applied to a system (e.g. system 100) or device. Box 410 may represent a power-up from any state in which power is absent or removed from all or a portion of system 100 and/or processor 110, a reset event, or any other event that causes system 100 and/or processor 110 to initiate a boot process.

In box 420, a key, a key (e.g., secret key 212) is loaded into an encryption engine (e.g., encryption unit 210). In box 430, entropy is loaded into the encryption engine; for example, an entropy extractor may be used to provide a source of randomness such that a random or pseudo-random output may be generated from a fixed input.

In box 440, a random number seed (RNS) is generated based on the key and the entropy; for example, based on a secure hash (e.g., by hash unit 220) of the output of an AES encryption (e.g., by encryption unit 210) using the key and entropy as inputs. The RNS may be used to generate any number of encryption keys by the system or device to protect information or otherwise provide security features.

In an embodiment of the present invention, control unit 240 may be used to cause crypto engine 200 to perform method 500 after box 410 of method 400 and before box 440 of method 400. However, method 500 and/or other method embodiments of the present invention may be used to protect secure boot processes other than method 400. In an embodiment, the pseudo-code shown in Table 2 may be used to implement method 500.

TABLE 2

```
1.  void sidechannel_detection( )
2.  {
3.      UCHAR rtcCurrent[7] = getTime( );         //read time from RTC
4.      UCHAR rtcPrevious[7] = getRTC( );         //read from PRAM
5.      UCHAR bootcnt = getBootCnt( );            //read from PRAM
6.      UCHAR maxcnt = getMaxCnt( );              //read from PRAM
7.      bool bTrigger = getTrigger( );            //read from PRAM
8.      const UCHAR NORM_BOOT_TIME = 15;          //15 seconds
9.
10.     //check hardware fuse to see if enabled
11.     if (isSideChannelDetectionFuseEnabled( ) == false) {
12.         normalBoot( );
13.         return;
14.     }
15.
16.     //check if this is the first time booting.
17.     //if so, need to setup PRAM
18.     if (rtcPrevious == FACTORY_DEFAULT_VALUE){
19.         setRTC(rtcCurrent);
20.         setBootCnt(0);
21.         setMaxCnt(Enthropy( ));
22.         setTrigger(false);
23.         normalBoot( );
24.         return;
25.     }
26.
27.     //an attack is detected so boot the tamper image
28.     if (bTrigger == true){
29.         setRTC(rtcCurrent);
30.         tamperBoot( );
31.         return;
32.     }
33.
34.     //check how much time has passed between boot/reset
35.     UCHAR diff = absolute(rtcPrevious − rtcCurrent);
36.     if ( (rtcPrevious >= rtcCurrent) || (diff <= NORM_BOOT_TIME) ){
37.         bootcnt++;
38.     }
39.
40.     //check if bootcnt reaches the limit.
41.     //if true, write values in PRAM and set the detection trigger
42.     if (bootcnt >= maxcnt){
43.         setRTC(rtcCurrent);
44.         setBootCnt(0);
45.         setMaxCnt(Enthropy( ));
46.         setTrigger(true);
47.         tamperBoot( );
48.         return;
49.     }
50.
51.     //write back to PRAM and proceed to normal boot
52.     setRTC(rtcCurrent);
53.     setBootCnt(bootcnt);
54.     normalBoot( );
55. }
```

In box 510 of method 500, a value (rtcCurrent) indicating the current time is read, e.g., from clock 230. In box 512, a value (rtcPrevious) is read, e.g., from PreviousRTC storage location 310, where the value indicates the most recent previously stored time.

In box 514, a value (bootcnt) is read, e.g., from BootCnt storage location 320, where the value indicates the number of consecutive times that the system or device has booted or attempted to boot in a manner that may correspond to a side channel attack, where each such boot or boot attempt may be referred to in this description as a "tampered" boot. For example, if the time since the last reset or boot is less than the normal boot time for the system or device, the current boot may be associated with a side channel attack and be considered to be a tampered boot.

In box 516, a value (maxcnt) is read, e.g., from MaxCnt storage location 340, where the value indicates a maximum number of consecutive tampered boots to be allowed before a trigger bit is set, and where the trigger bit may be used to initiate a protective reaction. In box 518, the trigger bit is read, e.g., from storage location 350, where the trigger bit signifies whether the maximum number of consecutive tampered boots has been detected.

In box 520, a constant (NORM_BOOT_TIME) is set to indicate the normal boot time for the system or device. The value for NORM_BOOT_TIME may be chosen based on the requirements of the system's boot process, and the value may be chosen to be high enough to add enough delay to render unfeasible an attempt to collect side channel measurements (e.g., to result in the trigger bit being set if the time between consecutive boot attempts is not at least a long enough time period to prevent or discourage a side channel attack). In one embodiment, NORM_BOOT_TIME may be set to fifteen seconds.

In box 522, it is determined whether a boot protection enable bit, e.g., indicator 242, is set. If so, then method 500 continues in box 524. If not, then method 500 continues to boot normally in box 580.

In box 524, it is determined whether the current boot attempt is the first time that the system or device is being booted, for example, since being assembled by an original equipment manufacturer or being provided by a vendor to a user. In an embodiment, the determination may be made by reading the contents of PreviousRTC storage location 310, and comparing the value is to a factory default value. If it is determined that the current boot attempt is not the first, then method 500 continues in box 540. If it is determined that the current boot attempt is the first, then method 500 continues in box 530 to set up NVM 250.

In box 530, the current time (e.g., rtcCurrent) is stored in PreviousRTC storage location 310. In box 532, BootCnt storage location 320 is initialized, e.g., to zero. In box 534, MaxCnt storage location 340 is initialized. In an embodiment, MaxCnt storage location 340 may be initialized to a random value (e.g., one of 3, 4, 5, 6, and 7) to reduce predictability that might be taken advantage of by a side channel attack.

In box 536, the trigger bit is cleared. From box 536, method 500 continues to boot normally in box 580.

In box 540, it is determined whether the trigger bit is set. If not, method 500 continues in box 550. If so, it may be presumed that an attempted side channel attack has been detected, and method 500 continues in box 542. In box 542, the current time (e.g., rtcCurrent) is stored in PreviousRTC storage location 310, so that the time of the attempted side channel attack may be available to firmware, software, and/or a user to implement a protective reaction. From box 542, method 500 continues to box 590, in which a special boot process is initiated.

The special boot process may include or cause a shutdown, a delayed boot, disabling of critical or secure operations, additional side channel attack detection and/or prevention measures, etc., which may be performed by the system, the device, and/or a user in response to any combination of firmware instructions, software instructions, user input, etc. In box 592, the trigger bit is cleared, e.g., in response to manual interaction by a user, such that the system or device may be booted normally again after an appropriate response to a potential side channel attack.

In box 550, the time of the current boot or boot attempt (e.g., rtcCurrent) is compared to the time of the most recent previous boot or boot attempt (e.g. rtcPrevious). In box 552, it is determined whether the comparison indicates that the current boot is a tampered boot (e.g., the difference between rtcCurrent and rtcPrevious is less than the normal boot time) or that the side channel detection mechanism itself has been attacked (e.g. rtcPrevious indicates a time that is more recent or the same rtcCurrent). If so, then method 500 continues to box 554, in which a current count of consecutive tampered boots (e.g., bootcnt) is incremented, then to box 560. Otherwise, method 500 skips box 554 and continues to box 560.

In box 560, it is determined whether the number of consecutive tampered boots has reached the allowed limit; for example, by comparing bootcnt to maxcnt). If not, method 500 continues to box 570. If so, then in box 562, the current time from clock 230 is stored in PreviousRTC storage location 310. In box 564, BootCnt storage location 320 is re-initialized, e.g., to zero. In box 566, MaxCnt storage location 340 is re-initialized. In box 568, the trigger bit is set. From box 568, method 500 continues to box 590, in which the special boot process is initiated.

In box 570, the current time from clock 230 is stored in PreviousRTC storage location 310. In box 572, the current count of consecutive tampered boots (e.g., bootcnt) is stored in BootCnt storage location 320. From box 572, method 500 continues to boot normally in box 580.

In various embodiments of the present invention, the methods illustrated in FIGS. 4 and 5 may be performed in a different order, with illustrated boxes combined or omitted, with additional boxes added, or with a combination of reordered, combined, omitted, or additional boxes. Furthermore, method embodiments of the present invention are not limited to methods 400 and/or 500, or variations thereof. Many other method embodiments (as well as apparatus, system, and other embodiments) not described herein are possible within the scope of the present invention.

Embodiments or portions of embodiments of the present invention, as described above, may be stored on any form of a machine-readable medium. For example, all or part of methods 400 and/or 500 may be embodied in software or firmware instructions that are stored on a medium readable by processor 110, which when executed by processor 110, cause processor 110 to execute an embodiment of the present invention. Also, aspects of the present invention may be embodied in data stored on a machine-readable medium, where the data represents a design or other information usable to fabricate all or part of processor 110.

Thus, embodiments of an invention for protecting a secure boot process against side channel attacks have been described. While certain embodiments have been described, and shown in the accompanying drawings, it is to be understood that such embodiments are merely illustrative and not restrictive of the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:
1. An apparatus comprising:
cryptography hardware to operate during a first boot process;
a clock;
a non-volatile memory including a first storage location in which to store a count of tampered boots and a second storage location in which to store a clock value to be used to determine whether a boot attempt is a tampered boot;

a comparator to perform a first comparison of the count of tampered boots to a limit; and control logic to, based on the first comparison, transfer control of the apparatus from the first boot process to a second boot process.

2. The apparatus of claim 1, wherein the non-volatile memory also includes a third storage location in which to store the limit.

3. The apparatus of claim 2, wherein the non-volatile memory also includes a fourth storage location in which to store a trigger to signify that the count of tampered boots has reached or exceeded the limit.

4. The apparatus of claim 1, wherein the comparator is also to perform a second comparison of a first value corresponding to a current time to a second value corresponding to a value in the second storage location, the second comparison to be used to determine whether the boot attempt is a tampered boot.

5. The apparatus of claim 1, further comprising a key to be used by the cryptography hardware during the first boot process, wherein the second boot process is to prevent the cryptography hardware from using the key.

6. The apparatus of claim 1, wherein the non-volatile memory comprises a phase change memory.

7. The apparatus of claim 1, wherein the cryptography hardware, the non-volatile memory, the comparator, and the control logic are within a secure crypto engine.

8. The apparatus of claim 1, wherein the second boot process is to initiate a protective reaction to a side channel attack.

9. A method comprising:
initiating a first boot process in which cryptography hardware is to operate;
reading a first clock value from a real-time clock;
reading a second clock value from a non-volatile memory;
comparing the first clock value to the second clock value to determine whether a boot attempt is a tampered boot
reading a count of tampered boots from the non-volatile memory;
comparing the count of tampered boots to a limit; and
transferring, based on the comparing, control from the first boot process to a second boot process.

10. The method of claim 9, further comprising incrementing the count of tampered boots if the comparing determines that the boot attempt is a tampered boot.

11. The method of claim 9, wherein the cryptography hardware is to use a key during the first boot process.

12. The method of claim 11, wherein the second boot process is to prevent the cryptography hardware from using the key.

13. The method of claim 9, wherein the second boot process is to initiate a protective reaction to a side channel attack.

14. The method of claim 9, further comprising:
setting the limit to a random number;
storing the limit in the non-volatile memory; and
reading the limit from the non-volatile memory for the comparing.

15. The method of claim 9, wherein the second clock value is read from a first location in the non-volatile memory, the method further comprising storing the first clock value in the first location after determining if the boot attempt is a tampered boot.

16. The method of claim 9, further comprising setting a trigger indicator in response to determining that the count of tampered boots has reached or exceeded the limit.

17. A system comprising:
a system memory in which to store confidential information; and
a processor including
cryptography hardware to operate during a first boot process;
a clock;
a non-volatile memory including a first storage location in which to store a count of tampered boots and a second storage location in which to store a clock value to be used to determine whether a boot attempt is a tampered boot;
a comparator to perform a first comparison of the count of tampered boots to a limit; and
control logic to, based on the first comparison, transfer control of the apparatus from the first boot process to a second boot process to protect the confidential information.

18. The system of claim 17, wherein the second boot process is to initiate a protective reaction to a side channel attack.

* * * * *